United States Patent
Crichlow

(10) Patent No.: US 9,591,385 B2
(45) Date of Patent: Mar. 7, 2017

(54) UTILITY DATA MEASUREMENT SYSTEM USING A SMARTPHONE

(71) Applicant: Henry Crichlow, Norman, OK (US)

(72) Inventor: Henry Crichlow, Norman, OK (US)

( * ) Notice: Subject to any disclaimer, the term of this patent is extended or adjusted under 35 U.S.C. 154(b) by 66 days.

(21) Appl. No.: 14/675,688

(22) Filed: Mar. 31, 2015

(65) Prior Publication Data
US 2016/0295304 A1    Oct. 6, 2016

(51) Int. Cl.
*G08B 23/00* (2006.01)
*H04Q 9/00* (2006.01)

(52) U.S. Cl.
CPC ........... *H04Q 9/00* (2013.01); *H04Q 2209/40* (2013.01); *H04Q 2209/50* (2013.01); *H04Q 2209/60* (2013.01)

(58) Field of Classification Search
CPC ..... G01S 5/0036; G01S 5/0054; G06Q 30/04; G06Q 50/06; G08C 17/00; H04Q 2209/60; H04Q 7/00
See application file for complete search history.

(56) References Cited

U.S. PATENT DOCUMENTS

| | | | | |
|---|---|---|---|---|
| 2012/0284096 A1* | 11/2012 | Gomes | ................... | G06Q 50/06 705/14.14 |
| 2012/0300348 A1* | 11/2012 | Franks | ..................... | H02H 3/10 361/42 |
| 2013/0254896 A1* | 9/2013 | Helmschmidt | ......... | G06F 21/64 726/26 |
| 2014/0214728 A1* | 7/2014 | Holmdahl | ............ | G06Q 20/145 705/412 |
| 2014/0232553 A1* | 8/2014 | Venkatraman | ........... | H04Q 9/00 340/870.07 |
| 2016/0171632 A1* | 6/2016 | Tatourian | ............... | G06Q 50/06 705/63 |

* cited by examiner

*Primary Examiner* — Kerri McNally
*Assistant Examiner* — Renee Dorsey

(57) ABSTRACT

This invention teaches a system for measuring utility data consumption using a smartphone or similar digital device in a crowd-sourced process.

2 Claims, 3 Drawing Sheets

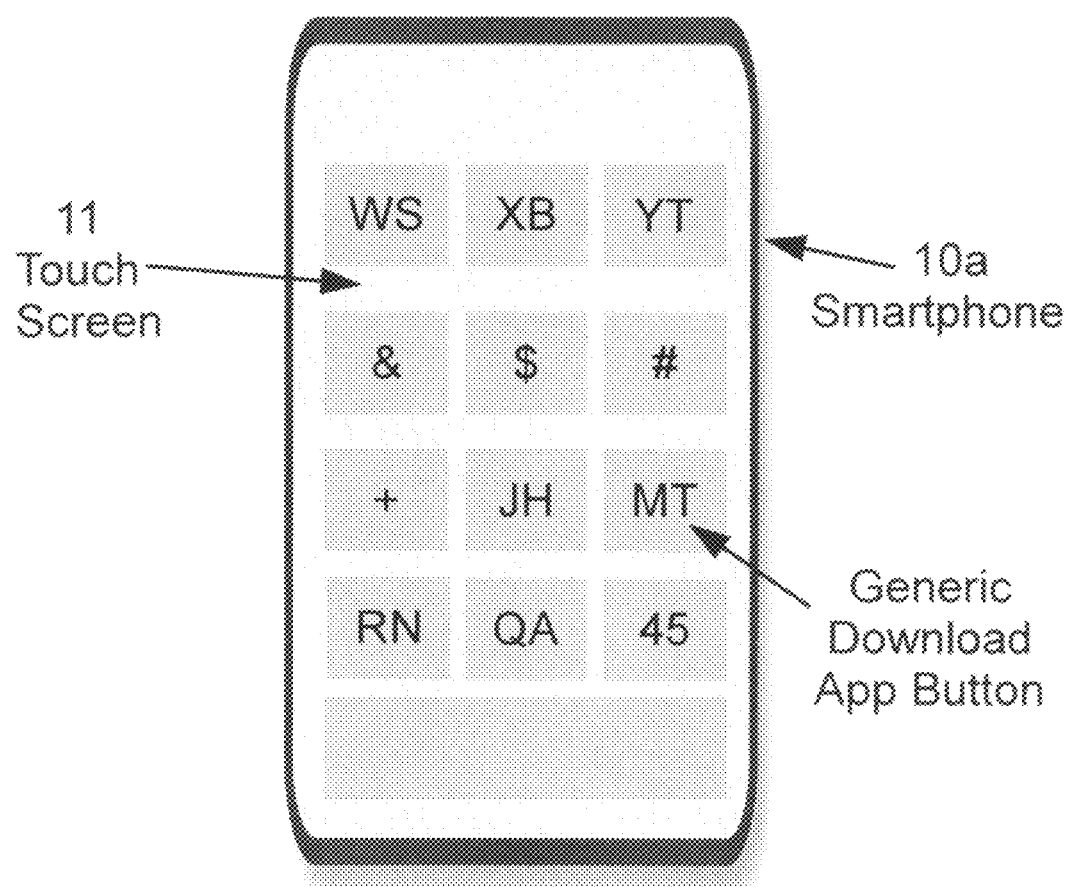
Fig. 3 – Generic Smartphone

UTILITY DATA MEASUREMENT SYSTEM USING A SMARTPHONE

TECHNICAL FIELD

The present invention relates to a telecommunication system for measuring utility commodity usage using a smartphone or similar digital electronic devices. More particularly and objectively it relates to a system for measuring commodity data usage in a crowd-sourced manner, using smartphones, thus mitigating the problems associated with current expensive smart meter reader installations and time consuming and labor intensive manual commodity data measurement methods, in order to increase reliability and accuracy and substantially decrease costs.

BACKGROUND OF THE INVENTION

Utility companies today have deployed millions of metering devices; at residential, commercial and industrial locations some are smart meters others are not considered smart. These smart meters and the low-tech meters are the "cash registers" of the utility companies since they determine how much electric energy and power are used by their paying customers and allow for accurate billing. Normally, reading meters has been a labor intensive and expensive operation that has to be done on a regular interval basis, and at least monthly.

Our current IT infrastructure is built on the decades old technology of a client-server connection. This has been the norm. However today there is a new innovative system that has supplanted in size, the existing infrastructure by the deployment of billions of wireless connected units that are primarily illustrated by the ubiquitous smartphone and secondarily by other digital electronic devices. There are more than 16 billion such items in use and they provide an untapped computer resource of tremendous size that can be tapped to provide information from a range of sensors. Using this hitherto untapped resource requires a new type of utilization and the subject patent application teaches a practical means for accomplishing this objective.

In the current discussion, the use of this innovative system to provide a means for interacting with utility commodity meters is discussed. For example, in a typical city there are about 1,000,000 residents and approximately 500,000 utility meters. To adequately interact with these meters operationally and obtain actionable data today, a typical utility spends more than $200,000,000 to install and maintain the minimum level of data acquisition with new smart meters in a typical utility-wide metering project. This massive capital investment is recovered by increased utility customer rates. However, at the same time there are approximately 1,000,000 smart devices existing in the same city. These include smart phones, tablets, PCs, game controllers and other types of digitally connected systems. These existing devices can be collectively used as a novel "crowd sourced" means of interacting with utility commodity meters. The existing devices form a crowd sourced medium when coupled with the properly deployed prerequisite software programs onboard which are easily and remotely downloadable digital applications or "apps" as they are commonly called today.

These smart devices and systems are ubiquitous, mobile in most cases, online 24/7, randomly located, well distributed across the total demographic domains and possess exceptional and sufficient computational power to do the job required. This job is done unobtrusively to the device owner, as described herein in this patent application. Further, emerging technologies, known to those skilled in the art, allow these digital devices to interact and connect directly to each other, even when needed bypassing the cellular and established networks. It should he noted that existing legacy utility meter systems have gone in the opposite directions of the current digital technologies. While the digital world has tried to provide widespread smaller, intelligent, ubiquitous solutions to data acquisition, the utilities have deployed expensive "mini-computer" like systems at their meter locations to obtain their usage data. Typical new smart high priced commodity systems range from $250 to $1000 each unit depending on complexity and locations.

The invention described herein with its operational features make the utilization of these devices an excellent solution to the expensive and daunting problem of operationally interacting with these millions of discrete and widely distributed meter locations using a "crowd sourced" approach in which the subject digital devices cooperate to accomplish the task of collecting commodity data on a continuous basis.

SPECIFICATION

BRIEF DESCRIPTION OF DRAWINGS

FIG. 3 shows an illustration of a generic smartphone as contemplated for use in this invention.

Figure 1:
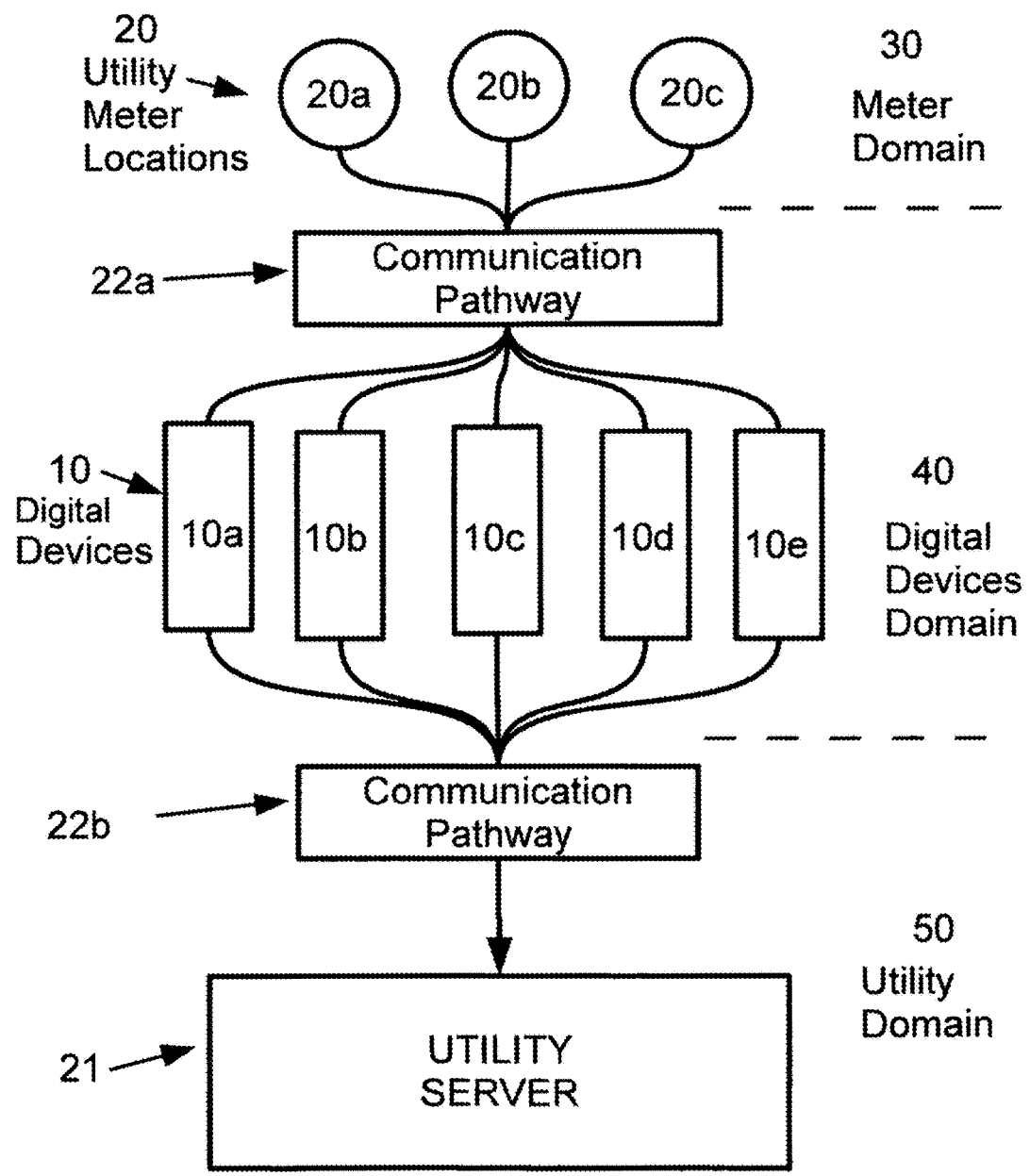
FIG. 1 is a block diagram illustrating a system for measuring utility commodity data according to the current invention.

Turning now descriptively to the drawings, in which similar reference characters denote similar elements throughout, the figures illustrate the system for managing commodity usage data via digital devices systems of the present invention. The following numbering is used throughout the various drawings.

9 data recording unit
10 digital device types
10$a$ smartphone
10$b$ tablet computer
10$c$ PC, laptop or desktop
10$d$ game box controller
10$e$ generic computer module
11 touch screen
12 retrieval unit
13 memory unit
14 calculation unit
15 GPS unit
16 Application program ("App")
17 communication unit
17$a$ first communication unit
17$b$ second communication unit
18 transmission units
18$a$, 18$b$, 18$c$ different types of transmission units
19 sensor units
19$a$, 19$b$, 19$c$ different types of sensor units
20 Utility meter
21 Utility server
22$a$ Communication pathway to utility meter
22$b$ Communication pathway to utility server
CPU Central processing unit
IT Information technology
Comm Communication

DETAILED DESCRIPTION OF THE INVENTION

As illustrated in FIG. 1, the system for determining commodity usage at a meter according to the present invention operates across three different and distinct domains or areas of interest, namely, the meter domain 30, the digital devices domain 40 and finally the utility domain 50. The system includes the utility meter 20, digital devices 10 and the utility server 21. The domains are connected by communication pathways 22a, 22b.

Figure 2:
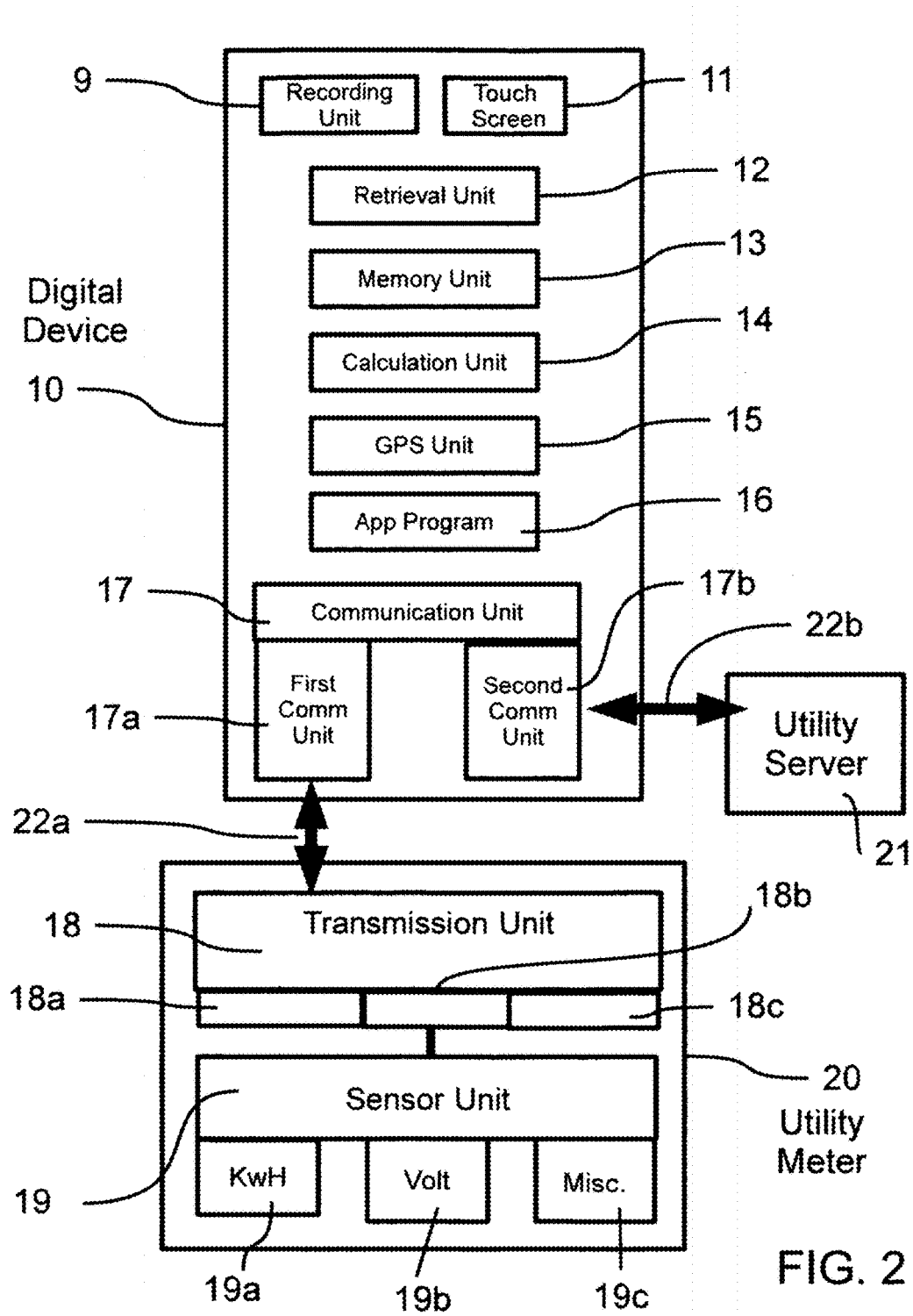
FIG. 2 is a block diagram illustrating further detail of the various components of the system for mcasnring commodity usage data according to this invention.

Referring to FIG. 2 the elements of the invention are illustrated. FIG. 3 illustrates a typical smartphone today. In the subject invention, and referring to FIG. 1 and FIG. 2, the digital device system 10 is exemplified by a smart phone 10a which is able to be installed with additional programs. These phones are deployed today in the billions of units worldwide and encompass two major brands, the I-Phone, a market brand of the company Apple Inc. and the Android, an operating system developed by the Google company. Other available digital devices are tablets 10b, personal computers 10c, these personal computers can be implemented as laptops or desktop types, game controller devices 10d and other generic CPU embedded devices like e-books 10e. Today, these digital devices 10 are sophisticated units which can accomplish a host of different operations, manually or automatically, in the foreground or in the background, and are especially developed and optimized to utilize downloaded applications 16 or "apps" which have exponentially increased in number since the phones and digital devices have become standardized by their manufacturers. These apps are routinely and easily updated with little effort by the users as improvements are made in their operation and efficiencies. The utility server 21 includes CPUs at the utility location capable of interfacing with the outside world. This utility CPU 21 performs all the management functions required by the utility for its ongoing operations.

The subject system described herein primarily illustrates the practical use of the free unlicensed electromagnetic spectrum, viz. Wifi and Bluetooth transmission frequencies. This zero-cost inventive feature allows the utilities to considerably lower overall capital and operating costs and still maintain a very high level of service to their customers thus increasing efficiency as a utility operator.

"Crowd sourcing" is defined in this application as the practice of obtaining needed services by soliciting and utilizing the activities of a large group of people from the online community rather than from traditional sources. The system for measuring commodity meter 20 usage according to the present invention increases the convenience and reliability of utility commodity measurement and data acquisition by introducing the concept of crowdsourcing with the ubiquitous intelligent digital devices in a manner that lowers both installation and operating costs and provides for a high degree of redundancy because of the massive numbers of available digital devices 10 across the country. Furthermore, many of these devices lay inactive or unused for a large percentage of the time in homes or offices. With this invention there is no need for expensive complex minicomputer like systems deployed at current operating meters but only for inexpensive "add-on", retro-fitted or embedded, or built-in modules to new meters, to collect the usage data and make it available for local transmission using low power Wifi, Bluetooth or similar simple transmission methods.

Today, most residences or commercial and industrial locations with meters 20 have on site, at the residence, or at the office, or in the factory, at least one smartphone 10a or similar device, be it a connected laptop 10c, tablet 10b, desktop 10c or similar digital device. In addition on any given day several hundred smartphone devices 10a in vehicles or other mobile means, pass by any fixed meter location and these mobile devices are capable of rapidly receiving the digital transmissions of these meter systems 20. Inexpensive efficient means are present today to transmit data over such short distances and the crowdsourcing process illustrated herein, provides an inexpensive means to rapidly accomplish the desired results of accumulating data from hundreds of thousands of meter locations using the smartphone type devices that are omnipresent.

In an embodiment of the invention, the commodity utility meter 20 which communicates with the digital device 10 is used to measure a plurality of commodity usage values. The commodity value is determined by a plurality of sensors 19 which are implemented on the meter 20. These sensors 19a, 19b, 19c are designed to read energy, demand and other commodity functions. The commodity data can be measured in analog or digital form. The data can be collected as a scalar or in image form, It can then normally be converted at the meter site to digital form, necessary for digital transmission.

A typical sensor unit for example, 19a measures KwH usage data and provides the data in a format that can be encrypted if needed and that can be transmitted using any of a plurality of transmission units 18a, 18b, 18c located at the meter 20. In an embodiment of the invention, a transmission unit 18 of the commodity meter 20 transmits the sensed usage data to a first communication unit 17a of the smartphone 10a, and also may be modified to enable both transmission and reception depending on the introduced functions. Hence, this transmission unit does not exclude the concept of a reception unit. The communication unit 17a of the smartphone 10a and a transmission unit 18a of the utility meter 20 may communicate with each other using wired or wireless communication means 22a. A second communication unit 17b of the smartphone 10a allows the smartphone 10a to communicate with the utility server 21 via pathway 22b.

IT processes today offer a variety of communication protocols that may be introduced to carry out communication between the communication unit 17 of the meter 20, in particular a second communication unit 17b of the smartphone 10a and the control server 21. Similarly a variety of communication means 22a occur for information transmission between the smartphone 10a and the commodity meter 20.

In the current embodiment of the system, the smartphone 10a with touch screen 11 includes the first communication unit 17a corresponding to the transmission unit 18 of the commodity meter 20, a calculation unit 14 for on-demand or optional processing the data obtained using the commodity usage sensor 19 of the meter 20, a GPS unit 15, a memory unit 13 in which a processing program for the calculation unit is stored and which stores commodity use data processed by the calculation unit and GPS information of the GPS unit 15, and the second communication unit 17b for sending the commodity data, the GPS information, meter ID data stored in the memory unit to the outside world, in particular, the control server 21.

The GPS unit 15 is used to accurately and reliably record position information of the meters. Both the commodity usage data and the meter identification information are recorded in the utility control server 21, and the respective meter site data are thus systematically recorded and overall managed and controlled by the utility in real time.

In the subject system for measuring commodity usage according to the present invention, the smartphone 10a preferably further includes a retrieval unit 12 for retrieving the commodity data stored in the memory unit 13, and the retrieval may be implemented using a touch input unit or a keypad provided to the display.

The quantity of data collected from the meter site 20 is unusually small by today's data transmission standards. The quantity of scalar or numeric data is only a few hundred bytes or less than 10 kilobytes per transmission. Graphic commodity data can be several hundred kilobytes and even at this level the transmission time and re-transmission by the smartphone 10a or other devices is fractionally in seconds only, in an operating environment where most data transmission is now at 4G rates of 20 Megabits per second. This usage data is normally transmitted by the meter 20 periodically, about four times an hour. This level of activity lasting only a few seconds at most, is almost imperceptible to the user of the smartphone or other device. It is about two-thousandths (0.002) of the time the device is operational and the smartphone app 16 does this usually in background mode. In this embodiment the smartphone 10a can be mobile in a vehicle or even when the user is walking or running in the vicinity of the meter 20 and still be able to collect and transmit the required commodity data as long as the digital device is within its range limits. Since so little of the smartphone's resources are required for implementation of this inventive system it is easy to see that widespread adoption across all levels of users is going to be an easy proposition. It is contemplated that even in some cases, the utility itself can attract hundreds of its own employees to be "crowd sourced" collaborators. In addition, a typical collaborator using this invention would install the app 16 on their smartphone as well as a laptop or tablet device.

In another embodiment of this invention, in those cases where the "primary" smartphone 10a, i.e. the "nearest-to-utility meter" smartphone 10a, is unable to directly connect to the utility server 21, the smartphone app 16 in the subject invention allows data from the utility meter 20 to be re-transmitted by the second communication unit 17b of the smartphone 10a to other nearby smartphones 10a until the "last" smartphone 10a is able to connect with the utility server 21 via this dynamic ad hoc network. In addition clever programming in the smartphone app 16 allows adjacent smartphones 10a or devices like 10b to simultaneously combine and manage their processing operations autonomously to increase the throughput capacity of the electronic network to transmit utility meter 20 data.

Since communicative means are built-in to the smart phones 10a, typical alarm operations and other real time notifications can be easily and routinely incorporated into the smartphone apps 16 so that both the utility and the enduser of the electric power can be notified by message or other means in the event of an pre-programmed event or disruption action occurs.

The smartphone preferably further includes a recording unit 9 for recording various historical data as determined by the utility or the user preferences.

Although a preferred embodiment of the present invention regarding the system for measuring commodity usage data and configuration with reference to the drawing has been described for illustrative purposes, those skilled in the art will appreciate that various modifications, additions and substitutions are possible, without departing from the scope and spirit of the invention as disclosed in the accompanying claims.

The invention claimed is:

1. A system for commodity data measurement comprising:
   a utility commodity meter having a sensor unit and a transmission unit,
   wherein the sensor unit includes one or more sensors for measuring commodity usage data, and the transmission unit includes one or more transmission modules, wherein the transmission unit transmits the commodity usage data and meter ID data, wherein the meter ID data is information that identifies a specific utility commodity meter; and
   a network connected digital device that is network connected to the utility commodity meter for at least some time, wherein the network connected digital device comprises:
   a first communication unit, wherein the first communication unit is in communication with the transmission unit of the utility commodity meter for the at least some time;
   a calculation unit, wherein the calculation unit processes the commodity usage data obtained from the utility commodity meter;
   a processing unit running a resident application program that instructs the network connected digital device in receiving, processing, storing, and sending of the commodity usage data;
   a GPS unit for communicating GPS information which is position information of the utility commodity meter;
   a memory unit which is stored and which stores the commodity usage data processed by the application program or processed by the calculation unit; wherein the meter ID data and the GPS information are also stored in the memory unit;
   a recording unit, wherein the recording unit records historical commodity usage data;
   a retrieval unit, wherein the retrieval unit retrieves the commodity usage data stored in the memory unit; and
   a second communication unit, wherein the second communication unit sends the commodity usage data, the GPS information and the meter ID data stored in the memory unit to a utility server or to another digital device.

2. The system according to claim 1, wherein the network connected dogital device is selected from a group consisting of the following digital device:
   a smartphone;
   a tablet;
   a laptop computer;
   a desktop computer;
   a game console; and
   an e-book device.

* * * * *